United States Patent
Dyks et al.

[11] Patent Number: 5,384,141
[45] Date of Patent: Jan. 24, 1995

[54] TEA PROCESS

[75] Inventors: Andrew J. Dyks, Irthlingborough; Paul M. Hart, Rushden, both of United Kingdom; Hans U. Ter Meer, Frankfurt am Main, Germany

[73] Assignee: Thomas J. Lipton Co., Division of Conopco, Inc., Englewood Cliffs, N.J.

[21] Appl. No.: 46,515

[22] Filed: Apr. 12, 1993

Related U.S. Application Data

[63] Continuation of Ser. No. 720,985, Jun. 25, 1991, abandoned.

[30] Foreign Application Priority Data

Jul. 3, 1990 [GB] United Kingdom ............ 9014756

[51] Int. Cl.$^6$ .............................................. A23E 3/16
[52] U.S. Cl. .................................... 426/478; 426/597
[58] Field of Search ........................ 426/597, 495, 478

[56] References Cited

U.S. PATENT DOCUMENTS

| | | |
|---|---|---|
| 2,891,865 | 6/1959 | Seltzer et al. . |
| 3,451,823 | 6/1969 | Mishkin et al. ............... 426/597 X |
| 4,315,036 | 2/1982 | Husaini et al. . |
| 4,539,216 | 9/1985 | Tse . |
| 4,552,769 | 11/1985 | Lunder et al. ............... 426/597 X |
| 4,680,193 | 7/1987 | Lunder et al. ................. 426/597 |
| 4,797,293 | 1/1989 | Evans et al. . |

FOREIGN PATENT DOCUMENTS

| | | |
|---|---|---|
| 0011332 | 5/1980 | European Pat. Off. .......... 426/597 |
| 166770 | 10/1902 | Germany . |
| 63-036745 | 2/1988 | Japan .............................. 426/597 |
| 1172834 | 12/1969 | United Kingdom . |
| 1284721 | 8/1972 | United Kingdom ............ 426/597 |

OTHER PUBLICATIONS

European Search report EP 91 201618.
International Journal of Food Sciences & Technology, vol. 25, No. 3, Jun. 1990, pp. 344–349.
Patent Abstracts of Japan, vol. 14, No. 126 (C-699), Mar. 9, 1990.

Primary Examiner—Joseph Golian
Attorney, Agent, or Firm—James J. Farrell

[57] ABSTRACT

Tea extract is separated into a lighter colored and a darker colored phase by changing the natural self-separating capacity of the tea extract by concentrating the extract to 6–45 wt %, preferably 12–30 wt % solids, cooling the concentrate below 5° C. and isolating the separated phases. The lighter colored phase is used in preparing clear cold-water soluble tea, reduced caffeine tea, isotonic tea. The darker colored phase may be used to prepare hot-water soluble instant tea, coloring agent, antioxidant or tea flavoring agent.

2 Claims, No Drawings

TEA PROCESS

This is a continuation application of Ser. No. 07/720,985, filed Jun. 25, 1991, now abandoned.

The present invention relates to a process of separating a tea extract into phases, particularly to a lighter colored phase and a darker colored phase thus obtained and more particularly to instant tea products at least partially consisting of the said phases.

It is well-known in the tea art that aqueous tea extracts contain a complex between caffeine and polyphenols (tea tannins) which at about 0.3 wt % solids concentration is insoluble at temperatures of below 25° C. Thus, on standing, a conventionally prepared aqueous tea extract will become cloudy as the temperature of the extract decreases toward ambient temperature or below. This clouding phenomenon is known in the art as "tea creaming" and this will be referred to throughout this specification and the attached claims as the natural self-separating capacity of tea extract. Hence, usually a decreaming step is employed in the manufacturing of many tea products to precipitate and remove this tea cream.

Thus it has been proposed in American Patent Specification U.S. Pat. No. 2,891,865 (T.J. Lipton Inc.) to cool a 3 to 5 wt % tea extract to a temperature in the range of 45° to 100° F. (7.2° to 37.8° C.) at which heavy creaming or separation of the extracted solid material from the tea extract occurs. The low temperature is maintained for sufficient time to effect precipitation or clouding of between 5 and 25% of the amount of tea solids, preferably until the system has reached substantial equilibrium between the solution and the separated solids. Thereafter, the separated solids are centrifuged off from the suspension. Although this process gives less creaming tea products, it is difficult to control and the tea extract upon dilution to typical tea drinking strength yields a beverage with poor palatability and taste, which does not remain clear upon prolonged storage at chill conditions. Almost all other processes aim at complexing the tannins by chemical means, or at solubilizing the formed cream by additives, or by physical and/or chemical means, these processes invariably entail the use of chemical additives and/or treatments, which is less desirable from the point of view of producing completely natural tea extracts without the use of any chemical additives and/or treatments.

In United States Patent Specification U.S. Pat. No. 4,552,769 (Nestec S. A.) a process has been described for the production of a completely natural powdered tea extract, soluble in cold water at 10° C., by extracting black tea leaf with hot water (60° C.-130° C.), concentrating the obtained aqueous extract to 5-12.5 wt %, cooling this concentrated extract to 5°-15° C. upon which an insoluble cream is formed, which is separated off. Subsequently this separated tea cream is extracted with water at a temperature of 40°-70° C. to yield a second aqueous extract, which is separated from the remaining insoluble cream. The first and the second aqueous extracts are subsequently mixed, concentrated and dried. Although this method indeed is a completely natural process, i.e. a process in which no chemical additives and/or chemical methods are used, the product obtained upon dilution to typical tea drinking strength does not yield a beverage which retains clarity upon storage at chill conditions over a longer period of time.

There is therefore still a need to produce completely natural tea extracts (i.e. tea extracts which are prepared without the addition of any chemicals) which upon dilution to typical tea drinking strength yields a beverage which retains clarity on storage at 5° C. for a prolonged period.

During extensive investigations of the natural self-separating capacity of aqueous tea extracts under various conditions, it was found that the tea cream formation could best be described as a phase separation within a multi-component system. Above a certain temperature (typically 70° C.-80° C.) aqueous tea extracts were stable to phase separation at all concentrations. However, on lowering the temperature, an increasingly wider concentration range became unstable and the solution yielded two distinct phases. The composition and concentration within each phase appeared to depend on the starting concentration as well as the separation temperature. It also appeared that an enrichment of some components occurred in one phase and a corresponding depletion in the other phase.

Moreover, the incipient instability of the multicomponent system appeared to depend not only on the total concentration, but also on the relative proportions of the various constituents.

The kinetics of tea cream formation depended on both temperature and concentration, but the phase separation could proceed via two entirely different mechanisms, which depended on the degree of super-cooling and the total solution concentration. For low degrees of super-cooling or at low or high concentrations, the separation process appeared to take place under binodal conditions, i.e. the tea cream phase formed by condensation out of the super-saturated solution in a nucleation and growth process. This mechanism resulted in a relatively broad size distribution of the particles with irregular shapes. The final coagulation of the tea cream droplets into larger aggregates of tea cream, however, appeared to be strongly hindered by surface charges on the newly formed tea cream particles. This electric charge effect reduced the rate formation drastically and explained the observed slow increase in turbidity over a long period of time.

For high degrees of super-cooling or in the medium concentration regime the phase separation appeared to occur spontaneously throughout the solution. Two spatially different structures of the newly formed phases were found, depending on the total volume of the minor phase. For volume fractions of the minor phase up to approximately 15% small droplets were formed. These droplets exhibited a narrow size distribution and their diameter depended only on the degree of super-cooling. Above this volume concentration, two inter-penetrating networks of the two phases were formed, which were very difficult to separate. Morphological investigations showed that tea cream indeed exhibits these two structures, depending on the total concentration of the tea. As in the case of binodal separation, electric surface charges here also hindered the final coalescence of the droplets.

Because this separation occurred spontaneously, the final separation was attained much quicker and more reliably than in the case of nucleation and growth. The final composition of the two phases appeared to be independent of the mechanism of phase separation, but the degree of tea cream phase dispersion did depend on the separation mechanism.

The results of these investigations led to a novel process of separating an aqueous tea extract into phases by changing the natural self-separating capacity (as hereinbefore defined) of the tea extract by concentrating the tea extract and lowering the temperature of the concentrated tea extract by which a phase separation is induced by the mechanism as described above, after which the separated phases in the concentrated tea extract are isolated and separately further processed, e.g. to beverages or to particulate instant tea products.

It was found thus that the "naturally" produced, cloudy or hazy, concentrated, lighter colored tea extract, obtained as one of the phases upon dilution to typical tea drinking strength yields a non-cloudy beverage, which retains its clarity upon storage at 5° C. for at least two months.

Moreover it was found that the cloudy, concentrated, lighter colored tea extract separated as one of the phases, had at reduced caffeine level. Thus a chill-stable beverage could be obtained, containing no additives and not having been subjected to any chemical treatment and which exhibited a reduced caffeine level.

Therefore the present invention relates to a process of separating a tea extract into phases, which comprises:
(a) changing the natural self-separating capacity (as hereinbefore defined) of the tea extract by concentrating the tea extract,
(b) inducing a phase separation by lowering the temperature of the concentrated tea extract to a value below 5° C., and
(c) isolating the separated phases in the concentrated tea extract.

The tea extracts used in the present invention can be obtained from at least partially fermented teas, e.g. black tea (which is preferred), oolong tea, or mixtures thereof. The process of the present invention can also be applied, however, to unfermented teas like green tea, in which case the separated phases have different colors and character.

When black tea is used in preparing the tea extract, it can be enzymatically pretreated with cell-wall-digesting enzymes, such as cellulase, pectinase or hemicellulase prior to extraction. The enzyme treated tea leaf provides a higher yield of tea extract, due to the better accessability of the leaf material for the extractant.

The tea leaf can then be extracted in a conventional manner to provide the tea extract. The tea leaf material is infused in hot water with a temperature between 50° C. and 100° C. (and if pressure is used the temperature can still be higher) in ratio of preferably about 10% leaf and about 90% of water, followed by separation of the leaf from the resulting extract. The obtained tea extract has a concentration of about 3–4% by weight of tea solids. The extraction may be carried out batchwise or continuously.

The obtained tea extract is subsequently concentrated, by which step the natural self-separating capacity (as hereinbefore defined) is changed. This concentration may be effected by membrane concentration (such as reverse osmosis), evaporation (such as rotary evaporation) during which step vacuum may be applied, or combinations of these concentrating methods, the tea extract is concentrated to 6 to 45% by weight of tea solids, and preferably to a concentration of 12 to 30% by weight of tea solids.

After the concentration step the concentrated tea extract is lowered in temperature to a value below 5° C. to induce phase separation. The phase separation may be induced in various ways. The concentrated tea extract may for example be placed in tall containers to effect the best passive separation with minimal interface area between the phases which develop in the extract. The containers with the concentrated tea extract are then cooled to a temperature below 5° C. for a period of at least 5 hours. In practice periods of between 6 and 48 hours have been used, a typical value being 16 hours; the longer the period of cooling, the better the separation, but of course there are economical factors limiting the cooling period. The temperature range to which the concentrated tea extract is cooled, is between the freezing point of the concentrated extract and just below 5° C., in other words: the phase separation is induced by bringing the concentrated tea extract into a super-cooled state.

It is preferred that no stirring is effected and that no ice crystals are formed in the cooled concentrated tea extract.

In another embodiment of the present invention the concentrated tea extract is cooled and the cooled concentrated tea extract is subsequently brought into a suitable refrigerated centrifuge. The temperature of the treatment again is such that the concentrated tea extract is in a super-cooled state. The tea extract is centrifuged for a period sufficient to effect a complete separation of the two phases which are formed, viz. a light orange colored layer and a dark brown colored layer, which latter in this case is obtained as a pellet. Centrifugation times of 2 hours or more have proved to be very suitable.

In a third embodiment of the present invention the phase separation is induced by freezing the concentrated tea extract. In freezing, the rate of cooling is dependent on the concentration of the tea extract, which in this embodiment preferably is between 15 and 30% by weight of tea solids, and upon the heat transfer between the concentrated tea extract and the freezing apparatus. When a 18–21 wt % concentrated tea extract was sealed in plastic bags and placed between the plates of a plate freezer at −40° C., phase separation was induced after 1 hour. After this time the samples were frozen solid and had the appearance of a bilayer with a thin top layer having a dark brown color and a bottom layer of light orange color, the boundary layer between the two phases being very sharp and distinct. The cooling rate in general is from 0.5° to 5° C. per minute and preferably from 2° to 3° C. per minute.

The phase separation process according to the present invention neatly partitions tea extracts into two compositionally distinct phases with greatly different solubility and appearance.

The one phase is from light orange to brownish in color and accounts for approximately 60 wt % of the material after separation and this phase is indicated throughout this specification and the attached claims as "the lighter colored phase". This lighter colored phase dissolves even cold water (5° C.) to yield an optically bright, clear solution, even at concentrations of 1% by weight of tea solids, which is about three times the normal beverage concentration. The beverage with this 1 wt % concentration retains its clarity upon storage at 5° C. for at least two months.

The present invention therefore also relates to a lighter colored, isolated separated phase of a concentrated tea extract, whenever prepared by the process according to the present invention.

The lighter colored phase appeared to be lower in caffeine and theaflavins, but higher in salts and thearubigins. The lighter colored phase is preferably converted into a particulate instant tea product by drying, optionally after a concentration step, preferably by membrane concentration. The drying may be spray-drying, but preferably freeze-drying.

The present invention therefore also relates to a particulate, cold water-soluble, instant tea product, at least partially consisting of the dried lighter colored, separated phase of a concentrated tea extract according to the present invention.

Further, the present invention relates to a reduced caffeine, tea based beverage comprising a lighter colored phase according to the present invention.

Finally, the present invention also relates to an isotonic tea-based beverage which at least partially comprises the lighter colored phase according to the present invention.

The other separated phase is dark brown to black in color and throughout this specification and the attached claims is referred to as "the darker colored phase". This darker colored phase only completely dissolves in hot water and at beverage concentrations it forms an intensily turbid, dark brown solution upon cooling. The darker colored fraction was lower in salt and thearubigins, but higher in caffeine and theaflavins.

The present invention therefore also relates to a darker colored, isolated separated phase of a concentrated tea extract, whenever prepared by the process according to the present invention.

Also this darker colored phase is preferably converted into a particulate instant tea product by drying, optionally after a concentration step. The phase is preferably dried by freeze-drying.

Hence the present invention also related to a particulate, hot water-soluble, instant tea product which at least partially consists of the dried darker colored phase obtained by the process according to the present invention.

The present invention also relates to a tea-based beverage comprising a darker colored phase according to the present invention.

The present invention also relates to a tea flavor composition (or a particulate ʰ a flavor composition) at least partially consisting of the darker colored phase according to the present invention.

The darker colored, isolated separated phase can be subjected again to the process according to the present invention, if desired. The darker colored phase can also be used as an anti-oxidant or a coʰoring agent, optionally after having been subjected again to the process according to the present invention.

The invention is now illustrated on hand of the following examples.

EXAMPLE 1

120 kg of deionised water was heated to 65° C. and passed through a column containing 12 kg of black tea leaf, to collect a dilute extract containing about 3 percent by weight of solids.

The hot dilute extract obtained was concentrated by reverse osmosis to between 20-25 percent by weight of solids and the warm extract obtained (55°-60° C.) was placed into polyethylene bags (size: 45.7 cm × 76.2 cm (18" × 30")) and heat-sealed 30.5 cm (12") from the end of the bags.

The sealed bags with warm extract were placed under slight pressure between the cooling plates of a horizontal plate freezer (operating at −37° C.) and left to freeze solid for between 30-60 minutes. A frozen block was obtained with a top (darker) layer and a bottom (lighter) layer, having a sharp boundary between the layers. When frozen, the thickness and solids content of the separated layers were assessed.

| Sample Vol. liters | Thickness Top Layer (dark) mm | Thickness Bottom Layer (light) mm | Dark Layer as percentage of total |
| --- | --- | --- | --- |
| 1 | 4.3 | 5.3 | 44.8 |
| 2 | 9.2 | 9.0 | 50.5 |
| 4 | 17.2 | 17.3 | 49.9 |
| 6 | 25.0 | 24.7 | 50.3 |

The frozen tea blocks were then freeze-dried and the obtained freeze-dried block was separated into the two major fractions.

The bottom fraction was lighter in color and readily soluble in cold water to yield a clear solution (even up to 1% solids concentration). The clear 1 wt % solution, when pasteurised at 85° C. for 2 minutes remained clear for 3 months in a refrigerator (5°-7° C.).

The darker phase, located above the lighter phase, at beverage concentration (0.3%) produced an intensely turbid, dark colored beverage.

EXAMPLE 2

In the same way as described in Example 1, a dilute tea extract was concentrated by reverse osmosis to a concentration of 18 per cent by weight of tea solids. The hot and still homogeneous concentrate was placed in:

(a) tall plastic cylinders and stored at chill temperature (0°-5° C.) for 16 hours;

(b) centrifuge tubes and centrifuged at −1° C. for 2 hours at 15000 g.

In both cases at the end of the treatment two distinct layers were visible with a sharp boundary between them, but here the lighter phase occurred above the darker phase. The properties of both the light and the dark layer were commensurate with those of the product according to Example 1. This Example also demonstrates that at chill temperatures a convenient phase separation is obtained.

EXAMPLE 3

An 18% by weight concentrated tea leaf infusion was prepared (using reverse osmosis) as described in Example 1. This concentrate was frozen into flakes, which were subsequently freeze-dried. From this freeze-dried particulate material a series of tea solutions was prepared, having different tea concentrations, using deionised water. The different solutions were placed in tall, translucent plastic cylinders. After ensuring solubility by heating the solutions to over 90° C. for 5 minutes, the samples were cooled at ambient (18° C.) for 2 hours.

The concentration range from 6-30 wt % exhibited the following proportional volume separations between light and dark phases after standing at chill (0°-5° C.) for 16 hours.

| Solution with wt % tea | % Light Phase | % Dark Phase |
| --- | --- | --- |
| 2% | No Separation | |

-continued

| Solution with wt % tea | % Light Phase | % Dark Phase |
|---|---|---|
| 6% | 96 | 4 |
| 12% | 66 | 34 |
| 18% | 56 | 44 |
| 24% | 49 | 51 |
| 30% | 42 | 58 |

The cylinders with the tea solution separated into light and dark phases were then blast frozen at −20° C. for 2 hours and subsequently freeze-dried. The lighter colored and darker colored layers were separated and the lighter fractions were found to have the same properties upon dissolving in cold water as the product for the lighter fraction described in Example 1. The lighter fractions could be stored for more than 3 months at 5°–7° C. without becoming turbid.

EXAMPLE 4

Three types of tea, viz. black leaf tea blend, ceylon tea and oolong leaf tea were extracted with deionised water in a weight ratio of leaf to water of 1:(10–13) respectively at a range of temperatures (60°–100° C.) for up to 15 minutes. The tea leaf was then forcibly compressed and again dispersed two times during extraction and the excess dilute liquor pressed from the hydrated leaf.

The dilute extracts obtained were then concentrated using rotary evaporation to an approximate concentration of 15wt % of solids. This concentrate was heated to over 90° C. for 5 mins to ensure solubility and then cooled to 80° C. before any "tar" droplets could coalesce and poured into tall plastic containers and left to cool at ambient.

The plastic containers with tea concentrate were then placed in a refrigerator for 16–65 hours to effect the best passive separation at a low chill temperature (from −1° C. to 5° C.).

After phase separation had occurred, the contents of the containers were blast frozen at −20° C. for 2 hours and freeze-dried. The lighter colored and darker colored layers were separated and they appeared to have the same attributes as the product obtained in Example 1.

If the temperature of the tea extraction was varied, the amount of lighter and darker fractions obtained after separation varied somewhat as may be seen from the summarized results below relating to the 15 wt % black leaf tea blend.

| Extraction temperature °C. | Mass Lighter Fraction | Mass Darker Fraction |
|---|---|---|
| 60 | 5.05 | 2.86 |
| 65 | 4.91 | 3.38 |
| 70 | 5.15 | 3.02 |
| 80 | 4.73 | 2.90 |
| 90 | 4.71 | 3.15 |
| 100 | 4.65 | 3.37 |

EXAMPLE 5

Green tea leaf was extracted with deionised water in a weight ratio of 1 part tea to 10–13 parts by weight of water at 100° C. in a stirred tank reactor. The mixture of leaf and water was kept in the tank for 3 minutes whilst stirring and then the contents of the tank were passed through a filter press to obtain a green tea extract of 1.5–2% by weight of solids.

This dilute extract was cooled to about 65° C. and concentrated by reverse osmosis to 16% by weight of solids. The concentrated extract was frozen into flakes on a cooling drum and the flakes obtained were freeze dried. From the freeze dried material obtained a series of solutions in deionised water was made, which were put into tall plastic cylinders, after having been heated to over 90° C. for 5 minutes to ensure complete solubilization of the samples.

The plastic cylinders with the samples were kept for 48 hours at a temperature between −1° C. and 5° C. and after this the following results were obtained:

| Sample concentration in wt per volume | Dark fraction Height in mm | Light fraction Height in mm |
|---|---|---|
| 2 | No separation | No separation |
| 5 | ibid | ibid |
| 10 | ibid | ibid |
| 15 | unclear separation | unclear separation |
| 20 | slight separation | slight separation |
| 25 | 18 | 82 |
| 30 | 21 | 79 |
| 35 | 36 | 64 |
| 40 | 50 | 50 |

The light fraction obtained after separation of the 40 wt % sample solution was clear after 3 months storage at 5° C.

We claim:

1. A process for separating an aqueous tea extract into a lighter colored aqueous phase and a darker colored aqueous phase, which comprises the steps of:
   (a) concentrating the extract to a concentration of from 6% to 45% by weight of tea solids,
   (b) inducing a phase separation into two distinct aqueous phases by a method selected from the group consisting of:
      1) super-cooling the concentrated aqueous tea extract during a period of at least 5 hours to a temperature between the freezing point of said extract and a temperature just below 5° C. without stirring and without ice crystal formation, the concentration prior to the chilling being greater than 20% by weight tea solids when the extract is an extract of green tea or black tea;
      2) freezing the concentrated tea extract below 5° C. at a rate of from 0.5° to 5° C. per minute, the concentration of the extract prior to the freezing being greater than 20% by weight tea solids; and
      3) centrifuging the concentrated tea extract at a temperature below 5° C., the concentration of the extract prior to the centrifuging being greater than 20% by weight tea solids; and
   (c) isolating the distinct separated aqueous phases, one of which is a lighter colored phase and the other of which is a darker colored phase.

2. A process according to claim 1, in which the aqueous tea extract in step (a) is concentrated by a unit operation selected from the group consisting of reverse osmosis, evaporation, membrane concentration and combinations thereof.

* * * * *